United States Patent [19]

Toot

[11] 4,128,995
[45] Dec. 12, 1978

[54] METHOD AND APPARATUS FOR STABILIZING AN AUGMENTER SYSTEM

[75] Inventor: Peter D. Toot, West Chester, Ohio

[73] Assignee: General Electric Company, Cincinnati, Ohio

[21] Appl. No.: 733,093

[22] Filed: Oct. 18, 1976

[51] Int. Cl.² .................. F02K 3/06; F02K 3/08; F02C 9/08
[52] U.S. Cl. .................. 60/204; 60/241; 60/243; 60/261; 60/39.28 R; 60/262
[58] Field of Search ............ 60/39.28 R, 39.27, 39.29, 60/261, 243, 204, 241

[56] References Cited

U.S. PATENT DOCUMENTS

| | | | |
|---|---|---|---|
| 3,205,655 | 9/1965 | Wright | 60/243 X |
| 3,293,847 | 12/1966 | Rogers | 60/243 X |
| 3,513,899 | 5/1970 | Paduch | 60/39.27 |
| 3,688,504 | 9/1972 | Hutchinson | 60/39.29 |
| 3,830,055 | 8/1974 | Erlund | 60/39.28 R |
| 3,852,958 | 12/1974 | Adams | 60/39.28 R |
| 3,854,287 | 12/1974 | Rembold | 60/243 X |
| 3,867,717 | 2/1975 | Moehring | 60/39.28 R |
| 3,908,363 | 9/1975 | Bauerfeind | 60/261 |

OTHER PUBLICATIONS

IHI Engineering Review (Japan), vol. 3, No. 5, Sep. 1970, Basic Study of After-Burner, pp. 37-53.

Primary Examiner—Robert E. Garrett
Attorney, Agent, or Firm—Dana F. Bigelow; Derek P. Lawrence

[57] ABSTRACT

A turbine is stabilized in high speed, high altitude flight conditions by reducing the maximum augmenter fuel-/air ratio in response to certain pressure and temperature conditions. Temperatures and pressures indicative of those at the combustor are sensed and the augmenter fuel schedule is accordingly modified to a level which provides reduced fuel/air ratios and stable burning conditions.

23 Claims, 3 Drawing Figures

U.S. Patent     Dec. 12, 1978     4,128,995
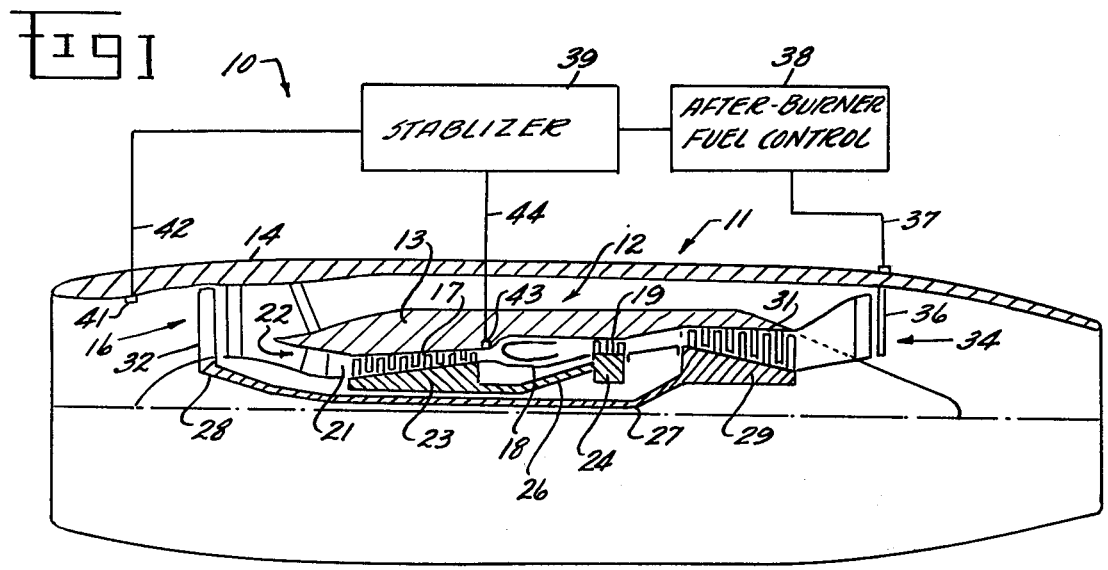
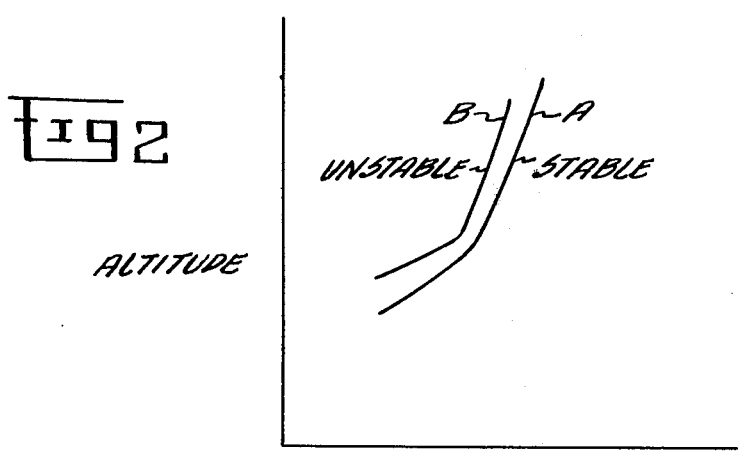
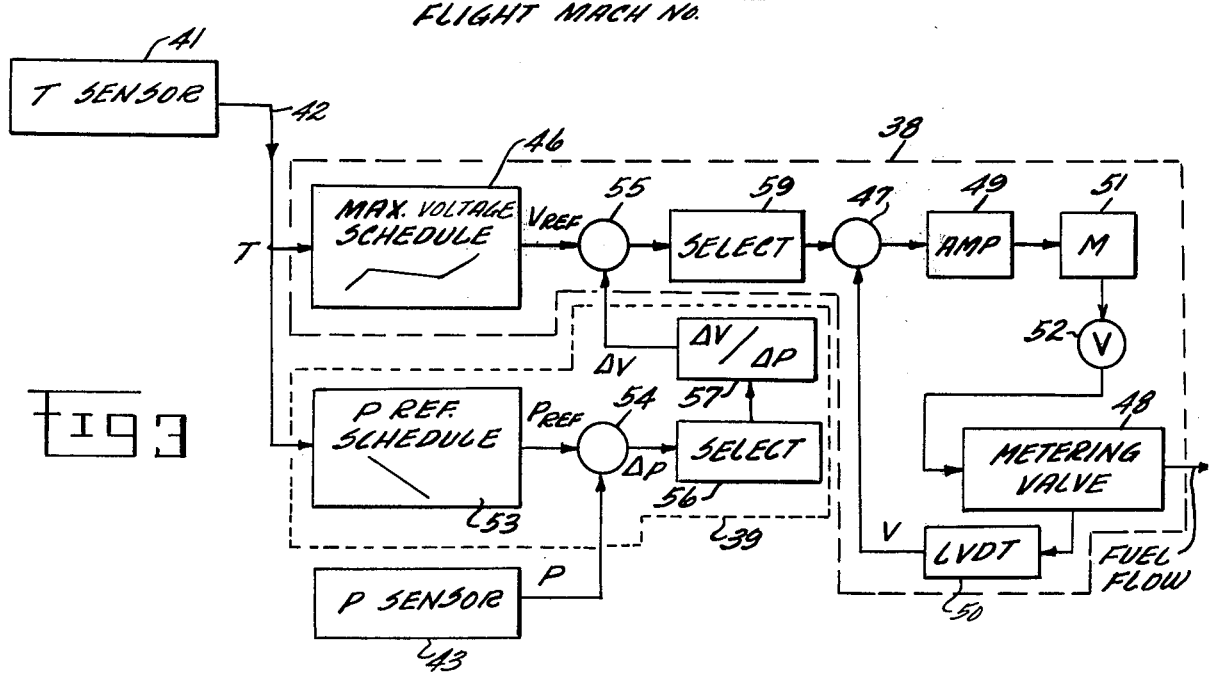

METHOD AND APPARATUS FOR STABILIZING AN AUGMENTER SYSTEM

The invention herein described was made in the course of or under a contract, or a subcontract thereunder, with the United States Department of the Air Force.

BACKGROUND OF THE INVENTION

This invention relates generally to aircraft engines and, more particularly, to fuel control systems for turbofan engines of the augmented type.

It has long been recognized that afterburning or duct burning turbofan engines are susceptible to rich instability conditions, sometimes called "rumble", during operation within certain portions of an air vehicle flight envelope. Rich instability is the pressure oscillation that occurs in the longitudinal mode of the burner wherein the amplitude may reach a level sufficient to cause structural damage. During these unstable conditions of operation, various undesirable conditions may result, such as, for example, stall, augmenter blow-out, or mechanical damage.

Rich instability differs in many respects from screech, which is a higher frequency transverse pressure oscillation which may occur in high pressure and high temperature conditions. In addition, while screech usually occurs at near stoichiometric fuel/air ratio, rich instability may reach unacceptable magnitudes at fuel/air ratios as low as 0.02.

It is recognized that at high altitudes and low Mach numbers, stable combustion cannot be maintained above a certain fuel/air ratio, commonly referred to as the rich stability limit. That is, for a particular flight condition, any further increase in altitude or decrease in Mach number will cause a reduction in the rich stability limit. In order to avoid the heretofore mentioned instability conditions which may cause mechanical difficulties and damage to the engine, it is necessary to maintain the fuel/air ratio to a point below the rich stability limits.

It is therefore an object of the present invention to maintain a stable combustion condition in an augmented turbofan engine.

Another object of the present invention is to maintain a fuel/air ratio of a turbofan engine at a level which does not allow a rich instability condition to exist.

Yet another object of the present invention is the provision for operating an augmented turbofan engine in high altitude and low Mach number conditions without encountering unstable burner conditions.

These objects and other features and advantages become more readily apparent upon reference to the following description when taken in conjunction with the appended drawings.

SUMMARY OF THE INVENTION

Briefly, in accordance with one aspect of the invention, sensors are provided to measure temperatures and pressures representative of those at the combustor inlet, and the augmenter fuel schedule is modified accordingly to maintain a fuel/air ratio which is acceptable for stable burning conditions.

By another aspect of the invention, the fan inlet temperature and compressor discharge pressure are sensed by the control system, and the fan inlet temperatures are used to schedule a reference value of compressor discharge pressure below which instability is likely to occur. The sensed compressor discharge pressure is then compared with the reference compressor discharge pressure, and the fuel control system is biased to reduce the fuel flow by an amount proportional to the difference therebetween. The amount of cutback is limited by preventing the scheduled fuel flow limit from dropping below a fixed level.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a schematic illustration of an exemplary augmented turbofan engine of the type suitable for use with the present invention.

FIG. 2 shows a graphic illustration of the rich instability regions of a typical flight map.

FIG. 3 is a schematic representation of a fuel control system employing an exemplary embodiment of the stabilization system of the present invention as shown in block diagram form.

DESCRIPTION OF THE PREFERRED EMBODIMENT

Referring now to FIG. 1, the invention is shown generally at 10 as incorporated into the control structure of a turbofan engine 11 which comprises a core engine 12 having a supporting structure or casing 13 which projects into the downstream end of an annular fan casing 14 so as to cooperatively define an exhaust duct 16 therebetween. The core engine 12 comprises a compressor 17, combustor 18 and a turbine 19 disposed in serial flow relationship along an annular flow core engine passageway 21 having an inlet 22. The compressor 17, and the turbine 19 include, respectively, rotor portions 23 and 24 which are interconnected and define a core engine rotor 26.

A low pressure rotor 27 is suitably supported by the casing 13 for rotation independently of the core engine rotor 26 and includes a fan rotor 28 and the rotor portion 29 of a low pressure turbine 31. The fan rotor includes a plurality of fan blades 32 which extend generally radially therefrom, upstream of the core engine passage inlet 22 and may include a plurality of booster stages (not shown) which extend across the core engine passage 21 for pressurizing the air prior to delivery to the compressor 17.

Located downstream of the low pressure turbine is an afterburner 34 which provides additional thrust and energy to the system by introducing fuel into the afterburners through fuel manifold 37 and fuel injectors 36 with the fuel being metered by an afterburner fuel control system 38. This fuel control system 38 operates automatically in response to a number of inputs (not shown) to schedule the fuel flow to the augmenter in the desired quantity and rate of flow.

In accordance with the present invention, a stabilizing system 39 is used to bias the fuel control system 38 during periods in which instability might exist, that is during periods of operation at high altitudes and low Mach numbers. A sensor 41 is installed in the fan casing 14 so as to enable the sensing of the fan inlet temperature, and a signal is directed along line 42 to the stabilizing system 39. Similarly, the sensor 43 provides along line 44 an indication of the compressor discharge pressure. In response to these two input signals then, the stabilizing system biases the fuel control system 38 to prevent fuel flow to the augmenter from exceeding the rich stability limit.

It can be seen by reference to FIG. 2, which shows the rich instability region of a typical flight map, that instability occurs during high altitude and low flight Mach number conditions. Curve A defines a locus of points, the region to the right of which represents flight conditions in which no reduction in the augmenter fuel flow schedule is required in order to maintain stabilty. Curve B defines a locus of points, the region to the left of which represents flight conditions under which an augmenter will be unstable without a full cut back of the maximum fuel/air ratio. The area between the curves A and B then represent an area which requires partial cut back of the fuel/air ratio by the stabilizing system in response to the pressure and temperatures sensed in the apparatus described hereinabove.

Referring now to the stabilizing system 39 in more detail as shown in FIG. 3, it is applied to and works in conjunction with a representative fuel control system 38, wherein fuel flow to the augmenter is controlled in accordance with a predetermined schedule. In such a control, the fan inlet temperature T is determined by a temperature sensor 41 immersed in the engine inlet airstream and a maximum voltage schedule 46 is generated as a function thereof. The resulting signal, $V_{ref}$, is then compared by the comparator 47 with a feedback voltage V from the metering valve 48 whose function is to modulate the amount of fuel that goes to the afterburner. The resulting error signal from the comparator 47 is then fed into an amplifier 49 and the amplified current is then used to drive a torque motor 51. The torque motor 51 in turn drives a servo valve 52 which ports fuel to one end or the other of the metering valve 48, with the metering valve 48 then moving to correct the error. The positioning of the metering valve is sensed by a linear, variable differential transformer (LVDT) 50 and the output is demodulated to provide the feedback voltage V to the comparator 47. Thus, at the maximum augmentation, the metering valve position is maintained at a value determined by the reference voltage level scheduled by the augmenter fuel control system 38.

In accordance with the present invention, the maximum voltage schedule discussed hereinabove is biased downwardly by a Δ V output of the rich stability limit circuit 39. This stability system 39 receives a temperature inlet signal T which represents the temperature of the air coming into the fan inlet. A pressure reference schedule 53 is then generated in response to the temperature input, with a resultant signal $P_{ref}$ representing a line on the flight map above which a maximum fuel/air ratio is prevented. Simultaneously, a pressure signal P representative of the compressor discharge pressure is obtained from the sensor 43, and both this signal P and the reference signal $P_{ref}$ are fed into a comparator 54 to generate an error signal Δ P. A selector circuit 56 then distinguishes the positive signals from the negative signals and passes only those signals wherein the actual pressure signals P are lower than the reference signals $P_{ref}$. This Δ P signal is then multiplied by a gain 57 to obtain a corresponding Δ V signal. The Δ V signal then is applied to a comparator 55 and selector 59 to modify the maximum voltage schedule in such a manner as to reduce the signal $V_{ref}$ under conditions which would otherwise cause a system to be unstable.

Described hereinabove is an apparatus and method for sensing variables that correlate with burner pressure and temperature, and limiting the fuel/air ratio to lower the maximum values when conditions approach predicted instability limits. It will be recognized by those skilled in the art that the concept as broadly described may be accomplished by any number of specific methods and apparatuses. For example, instead of sensing the fan inlet temperature and the compressor discharge pressure, it may be desirable to sense other temperatures and pressures and correlate them to the particular engine system. Thus, the temperature of the compressor discharge air may be sensed or the pressure at the inlet to the fan, or even the actual augmenter inlet temperature and pressures may be sensed. The particular locations described hereinabove are shown simply because of the convenience and existence on present state-of-the-art engines, of the pressure and temperature sensors.

Having thus described the invention, what is claimed as novel and desired to be secured by Letters Patent of the United States is:

1. In a jet engine combustion apparatus, an improved fuel control system of the type for scheduling the fuel/air ratio to the combustion apparatus in response to predetermined engine operating parameters, wherein the improvement comprises:
   a. means for sensing pressures indicative of the air pressure in said combustor;
   b. means for sensing temperatures representative of the air temperature in said combustor;
   c. means for generating in terms of one of the engine operating parameters a schedule indicative of the combustor rich stability limit; and
   d. means for maintaining operation of the engine within the rich stability limit by modifying the fuel/air ratio schedule in response to both said sensed pressures and temperatures.

2. An improved fuel control system as set forth in claim 1 wherein the jet engine includes a compressor and said pressure sensing means is located at the discharge end of the compressor.

3. An improved fuel control system as set forth in claim 1 wherein the jet engine includes a compressor and said temperature sensing means is located forward of the compressor.

4. An improved fuel control system as set forth in claim 3 and including a jet engine inlet, wherein said temperature sensing means is located in the inlet to the jet engine.

5. An improved fuel control system as set forth in claim 1 wherein said combustion apparatus comprises an afterburner.

6. An improved fuel control system as set forth in claim 1 wherein said modifying means includes means for generating a pressure schedule in response to said temperature sensing means.

7. An improved fuel control system as set forth in claim 6 and including comparator means for comparing said generated pressure schedule with said sensed pressures.

8. A method of stabilizing a fuel control system of the type which schedules the fuel/air ratio to a combustion apparatus in response to certain engine operating parameters, comprising the steps of:
   a. sensing pressures representative of the air pressure in the combustor;
   b. sensing temperatures representative of the air temperatures in said combustor;

c. generating a schedule indicative of the combustor rich stability limit; and d. maintaining operation of the engine within the rich stability limit by modifying the fuel/air ratio in response to both said sensed pressures and temperatures.

9. A method as set forth in claim 8 wherein the pressure sensing step is accomplished by sensing pressures upstream of the combustion apparatus.

10. A method as set forth in claim 8 wherein said sensed pressures are the compressor discharge pressures of the engine.

11. A method as set forth in claim 8 wherein said sensed temperatures are those at the engine inlet.

12. A method as set forth in claim 8 wherein said combustion apparatus comprises an engine afterburner.

13. A method as set forth in claim 8 wherein said maintaining step includes the step of generating a pressure schedule in response to said sensed temperatures.

14. A method as set forth in claim 13 wherein said maintaining step includes the step of comparing said generated schedule with said sensed pressures.

15. An improved fuel control system for scheduling fuel flow to an afterburner in response to predetermined engine operating parameters wherein the improvement comprises:
   a. means for sensing pressures representative of those in the afterburner;
   b. means for sensing temperatures representative of those in the afterburner;
   c. means for generating in terms of one of the engine operating parameters a schedule indicative of the combustor rich stability limit; and
   d. means for maintaining operation of the engine within the rich stability limit by modifying the fuel flow schedule in response to both said sensed pressures and temperatures.

16. The fuel control system of claim 15 wherein said pressure sensing means measures the compressor discharge pressures.

17. The fuel control system of claim 15 wherein said temperature sensing means measures the engine inlet temperature.

18. An improved fuel control system as set forth in claim 1 wherein said schedule generating means operates in response to said temperature sensing means.

19. An improved fuel control system as set forth in claim 1 wherein said schedule generating means generates a schedule in terms of compressor discharge pressures.

20. An improved fuel control system as set forth in claim 19 wherein said maintaining means includes means for comparing said schedule with the output from said pressure sensing means.

21. An improved method of stabilizing a fuel control system as set forth in claim 8 wherein said generating step is accomplished in response to said temperature sensed.

22. An improved method of stabilizing a fuel control system as set forth in claim 8 wherein said generating step results in a schedule of compressor discharge pressures.

23. An improved method of stabilizing a fuel control system as set forth in claim 22 wherein said maintaining step includes the step of comparing said schedule with said pressure representative of the air pressure in the combustor.

* * * * *